United States Patent Office 3,059,524
Patented Oct. 23, 1962

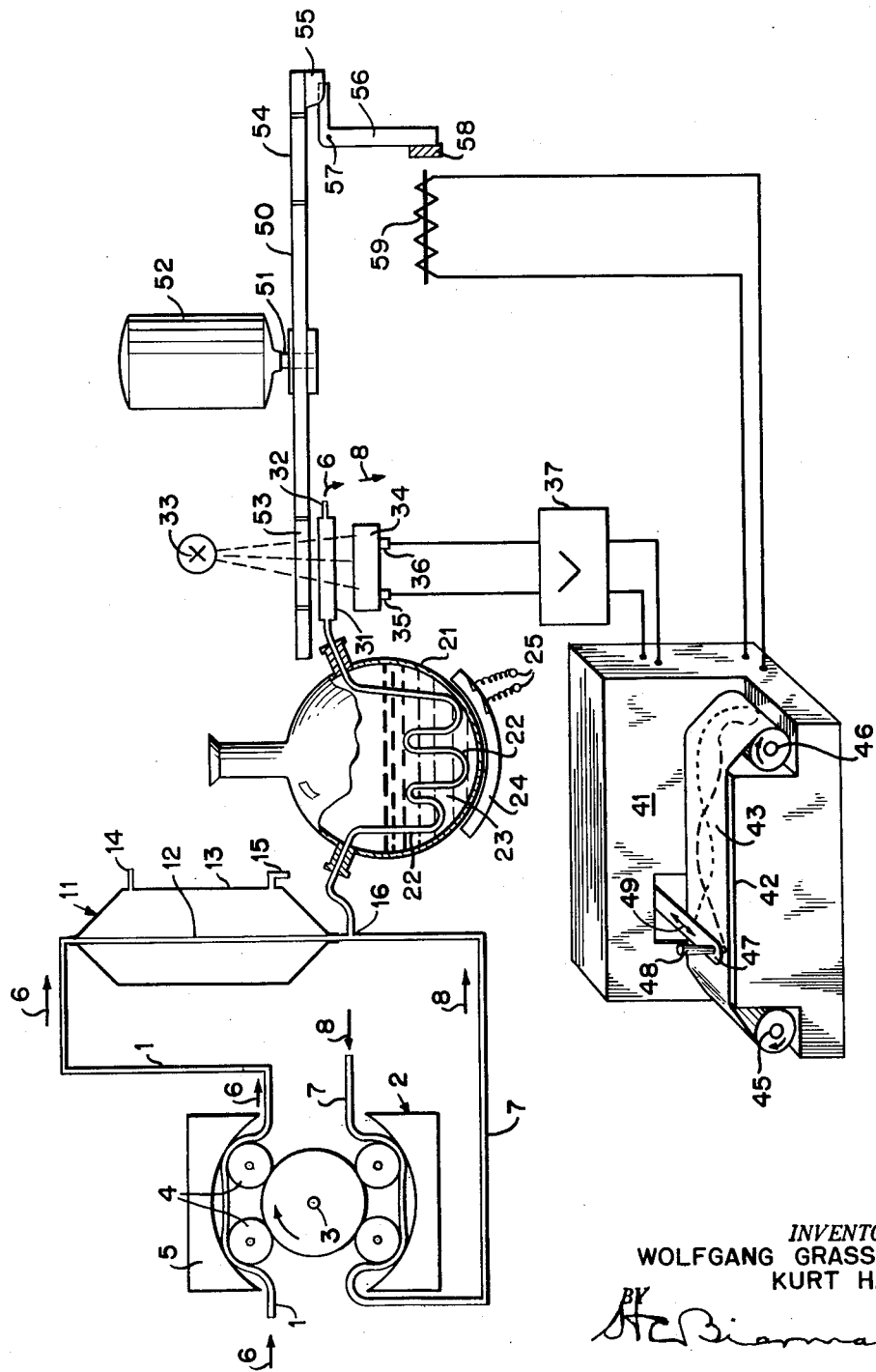

3,059,524
METHOD AND APPARATUS FOR THE CONTINUOUS COLORIMETRIC DETERMINATION OF THE INDIVIDUAL COMPONENTS OF A MIXTURE
Wolfgang Grassmann and Kurt Hannig, both of Schillerstrasse 25, Munich 15, Germany
Filed June 2, 1959, Ser. No. 817,662
Claims priority, application Germany June 4, 1958
6 Claims. (Cl. 88—14)

The present invention relates to a method and an apparatus for the continuous quantitative colorimetric determination of the individual components of a mixture which are dissolved in a continuously flowing liquid.

The object of the invention is a method in which the different components of a mixture can be separated even if they are present successively in time, and in part also overlapping, in a stream of liquid. In particular, it is possible in accordance with the present invention to determine the individual components in a stream of liquid which has previously passed continuously through a chromatographic column, without it being necessary in this connection to effect the separation in the chromatographic column to such an extent that the individual components no longer overlap.

In order to obtain a dependable determination of the individual components of the mixture, even in as difficult a case as that indicated above, the mixture is conducted, in accordance with the invention continuously through a colorimeter, possibly after the addition of suitable selective dyeing agents. This colorimeter is so developed that a series of individual measurements can be carried out in a continuous sequence, a given filter being inserted for each individual measurement in the path of the beam between the source of light of the colorimeter and the receiver, for instance, the photoelectric cell, the thermocouple or the like.

As such filters, there are used filters characterized by selective absorption, for instance color filters, there being employed a set consisting of as many filters as there are components in the mixture. The individual filters of such a set are so introduced in predetermined sequence, one after the other, in the path of the beam, that upon each individual measurement in each case only one filter is present in the path of the beam. When the last filter of the set has been used, one starts over again with the first filter of the set and the remaining filters of the set are introduced in the path of the beam one after the other, at all times in the same sequence.

The color of the filters is so selected that the filters are adapted to the colors of the colored individual components of the mixture so that each curve on the recording tape corresponds to a single component of the mixture.

If a plurality of individual components give the same color upon the dyeing, the resultant curves could not be distinguished from each other. However, this difficulty can be overcome by a change in the dyeing agents.

The colorimeter is advisedly developed in the manner that at the place where the filters are inserted in the path of the beam, there is sufficient space conveniently to effect the replacement of the filters. There is preferably used for this purpose an automatic device which, for instance, is so controlled by the feed of the recording tape of the colorimeter at regular time intervals that in each case the filter which is just at that time in the path of the beam is moved out of the path of the beam and the next filter brought into the path of the beam.

For the dyeing there is particularly suitable a ninhydrin solution, which is added to the stream of liquid containing the mixture before said stream of liquid enters the colorimeter. Between the place of addition of the ninhydrin solution and the colorimeter, said stream of liquid is preferably heated. In accordance with a preferred embodiment of the invention, this heating is effected in a thin tube which is so inserted in a water bath that it forms several turns or loops in said bath. The temperature of the water bath is advisedly maintained in this connection at about 100° C. (212° F.) and the inside diameter of the tube is so selected that the time of stay of the flowing liquid in the region of the water bath is about 20 minutes.

The automatic recording device operates particularly well when the stream of buffer solution which is introduced into the top of the chromatographic column is adapted to the stream of ninhydrin solution which is admixed to the efflux from the column. This adaptation can be effected for instance by pumping the buffer solution and dyeing agent by one and the same tube pump; two separate pumps can also be used, the drive of which can be varied in a given ratio, for instance via an infinitely variable gearing.

To the colorimeter there is connected a recording device by which the output of the receiver of the colorimeter, and therefore for instance of the photoelectric cell, is converted, possibly after prior amplification by means of magnetic devices known per se in recording devices into a deflection of a writing tool which writes on a support which is preferably continuously moving, for instance on a recorder chart.

As recording instrument, there is preferably employed an automatic extinction recorder with logarithmic characteristic, such as described in German patent application B 20 414 IXb/42h and in German patent application B 42 434 IX/42m.

For the carrying out of the method of the invention, there is preferably used an automatic extinction recorder with logarithmic characteristic which is provided with a set of filters which are inserted at regular time intervals into the beam between the source of light and the photoelectric cell. The starting of the movement of a filter and the withdrawal of the filter present can, for instance, be effected by the uniformly rotating drum on which the recording chart is wound.

The filters can be arrranged for instance on a turnably supported circular disk which is turned intermittently by a limited angle to such an extent that in each case the next filter passes into the path of the beam. After the introduction of the filter, the marking and recording device of the extinction recorder is caused to mark a point, for instance by means of a relay. In the case of a rotary disk, this can be effected for instance in the manner that the disk, after completing the limited rotary motion, strikes a stop which actuates the extinction recorder.

The drive for the feed of the filters can advisedly be effected by means of a synchronous motor, the winding of which is such that it can be continuously under voltage so that the shaft of the motor which is normally braked can, after the release of the brake, carry out the corresponding rotary motion by which the withdrawal of one filter and the introduction of the next filter is effected.

In order that the curves recorded by the recording instrument can be more easily distinguished, a device can be provided by means of which the marking is correspondingly characterized, depending on the filter which has just been inserted. Thus, for instance, the length of the individual markings made could be varied in accordance with the specific filter, or a multicolor inked tape could be inserted, as in the case of dotted-line recorders, below the marking stylus so that the individual curves which correspond to the individual filters can immediately be distinguished from each other by their appearance.

The method of the invention, as well as the apparatus for carrying out the method, makes possible a substantially continuous, completely automatic operation of the colorimeter, which is of great importance, particularly since the processes which are to be recorded take place over long time intervals, so that the task of the operator of the automatic colorimeter is greatly facilitated by the invention.

One example, by way of illustration, of a measuring device developed in accordance with the invention will be described below with reference to the attached drawing, in the sole FIGURE of which such a measuring arrangement is shown.

Through the tube 1 a stream of liquid which serves for separating mixture of substances to be separated is fed to a tube pump 2. This tube pump 2 contains a driven shaft 3, with which a plurality of rotatably supported rollers 4 are connected which press the tube 1 against a base 5, as a result of which the liquid contained in said tube 1 is conveyed in the direction indicated by the arrows 6. In a similar manner a dye, for instance a ninhydrin solution is fed to the tube 7, this solution also being conveyed in the direction of the arrows 8 by the action of the rollers 4 of the tube pump. The conduit 1 discharges into the chromatographic column 11, which consists of the column 12 proper and a cooler 13 which is provided with an inlet 14 and an outlet 15 for the cooling liquid. At the point 16 the dye which is fed in the direction of the arrows 8 comes into contact with the mixture to be separated which flows from the column as indicated by the arrows 6, and the dye and mixture are then conducted through a water bath 21 in which the tube 22 lies in several turns in a liquid 23 which is heated advisedly by an electric heater 24 which is provided with current by means of the terminals 25. The mixture coming from the water bath 21 then flows through the cell 31 and is discharged at 32. This cell is irradiated by the light of the lamp 33, the beam of light emerging from the cell striking a receiver 34 which for instance may be in the form of a photoelectric cell. The two output terminals 35 and 36 of the photoelectric cell are connected with the input of an amplifier 37 which is connected to a recording instrument 41. This recording instrument contains a table 42, on which a recording chart 43 slides, this chart unwinding from a supply roll 45 and being wound onto a driven roll 46. The recording instrument furthermore contains an arm 47 movable in the direction of the double arrow 49 and bearing a stylus 48. In addition to the movement of arm 47 in the direction indicated by the double arrow 49, the instantaneous position of which is dependent on the intensity of the light incident on the photoelectric cell 34, this arm can furthermore be raised and lowered at regular intervals at right angles to the plane of the paper of the recording chart 43. This vertical movement of the recording arm 47 is controlled for instance by a relay, not shown in the drawing, from the rotary disk 50 described below.

This rotary disk 50 is fastened to the shaft 51 of an electric motor 52, the winding of which is of such high ohmic resistance that it can be continuously under voltage, even when the disk 50 is prevented from rotating by a brake. The disk 50 contains a number of filters arranged along a concentric circle, filters 53 and 54 being visible in the sectional drawing.

The disk 50 furthermore contains a number of stops 55, which cooperate with a lever 56 which is pivotally supported at 57 and is provided at a suitable point with an armature 58 which can be attracted by the electromagnet 59. This electromagnet receives its current as the result of pulses which are given off by the recording instrument 41 whenever the drum 46 has moved through a given angle, for instance 5°. The giving off of the pulses can be brought about by a cam, not shown in the drawing, connected to the shaft of the drum 46 and by a switch which cooperates with this cam.

Upon uniform rotation of the drum 46 and thus upon uniform forward motion of the recording chart 43, the electromagnet 59 is energized at uniform time intervals and the lever 56 lowered in such a manner that the stop 55 is released and the disk 50 can continue to turn until the lever 56 which moves back into the rest position again comes against another stop 55. In this way a new filter is brought into the path of the beam between lamp 33 and the photoelectric cell 34 upon each rotational step.

We claim:

1. Method for the quantitative determination of the non-uniformly distributed components of a mixture having the following steps: introducing the mixture into a chromatographic column, washing the chromatographic column with a buffer solution, continuously allowing the buffer solution with the components of the mixture dissolved therein to flow out, adding at least one indicator which controls the transparency of the solution for light with a wave length characteristic of at least one of the components contained therein to an extent corresponding to the content of said component in the solution, passing therethrough a series of rays of light having at least one light ray of a wave length characteristic for a given component in the solution, measuring the amount of light of each of these rays individually passing through, recording the measured value corresponding to this transmitted amount of light of each ray as a dot having a position in width corresponding to the amount of light on a strip-shaped recording medium and advancing the said strip-shaped recording medium in such a manner that successive dots form curves, each corresponding to the amount of light passed through in each one of these wave lengths so that each curve is comparable with the proportion of a given component of the solution.

2. Apparatus for the automatic quantitative determination of irregularly distributed individual components of a mixture containing the combination of: a chromatographic column, means for charging the mixture to be analyzed into the chromatographic column, means for continuously feeding a buffer solution for the washing of the mixture out of the chromatographic column, a conduit for discharging the buffer solution continuously discharging from the chromatographic column with the dissolved components of the mixture, means for introducing into the buffer solution continuously discharging from the chromatographic column, an indicator in a predetermined ratio controlling the transparency of the solution for light of wave lengths characteristic of at least one of the components to an extent corresponding to the content of said component in the solution, means for passing a light beam through the buffer solution with dissolved components, continuously discharging from the chromatographic column through the said conduit, photoelectric means which emits an output pulse corresponding to the amount of light passing through the solution flowing through the conduit, and means for successively varying the wave length of the beam of light in such a manner that successively a series of light beams is sent through the solution discharging through the conduit, each of which beams has a wave length corresponding in light transmittancy to one of the components, said series being successively repeatedly passed through the solution in the said conduit as long as solution discharges from the chromatographic column, and means for transferring the output pulse of the said photoelectric means to a punctiform recorder in such a manner that for each beam of light a dot is transferred to a recording tape moved in one direction and the position of the dot in a direction approximately at right angles to the direction of advance of the strip corresponds to the value of the light which has passed through.

3. Apparatus according to claim 2 characterized in that the means for introducing the buffer solution and the indicator are synchronized.

4. Apparatus according to claim 2 characterized in that a capillary tube is provided for the passage of said solution, and means for heating it to a temperature of about 100° C.

5. Apparatus according to claim 2 characterized in that said means for successively passing the beams of light as successive series of individual beams of different wave length through the buffer solution discharging from said line being a rotating disc having on its periphery filters for the selection of light of predetermined wave length from a beam of white light, means being provided to control the actuation of the punctiform recorder as a function of the movement of the disc.

6. Apparatus according to claim 5 characterized in that means are provided for changing the position of the measuring point of the disc carrying the filters.

References Cited in the file of this patent

UNITED STATES PATENTS

| | | |
|---|---|---|
| 1,894,132 | Stone | Jan. 10, 1933 |
| 2,152,645 | Holven et al. | Apr. 4, 1939 |
| 2,544,196 | Varden | Mar. 6, 1951 |
| 2,633,472 | Eberz | Mar. 31, 1953 |
| 2,910,909 | Stone et al. | Nov. 3, 1959 |
| 2,921,498 | Simmon et al. | Jan. 19, 1960 |
| 2,968,988 | Crosfield | Jan. 24, 1961 |

OTHER REFERENCES

"Automatic Ultraviolet Spectral Scanning of Chromatographic Effluents," Analytical Chemistry, Kenyon et al., vol. 27, issue No. 12, December 1955, pages 1888–1891.